United States Patent
Pamin

(10) Patent No.: US 12,420,467 B2
(45) Date of Patent: Sep. 23, 2025

(54) CASTING TOOL, METHOD AND USE OF A CASTING TOOL FOR POSTFORMING A CAST PART AND CAST PART

(71) Applicant: TE Connectivity Germany GmbH, Bensheim (DE)

(72) Inventor: Rudolf Pamin, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 281 days.

(21) Appl. No.: 17/901,937

(22) Filed: Sep. 2, 2022

(65) Prior Publication Data

US 2023/0066894 A1     Mar. 2, 2023

(30) Foreign Application Priority Data

Sep. 2, 2021   (DE) .......................... 102021122734.8

(51) Int. Cl.
   *B29C 45/26*     (2006.01)
   *B29C 45/44*     (2006.01)

(52) U.S. Cl.
   CPC .............. *B29C 45/26* (2013.01); *B29C 45/44* (2013.01); *B29C 2045/445* (2013.01)

(58) Field of Classification Search
   CPC .... B29C 2045/445; B29C 45/26; B29C 45/44
   See application file for complete search history.

(56) References Cited

U.S. PATENT DOCUMENTS

| | | | |
|---|---|---|---|
| 4,927,287 A | * | 5/1990 | Ohkawa ................ F16B 21/086 411/21 |
| 5,232,718 A | * | 8/1993 | Miyazawa .............. B29C 45/33 425/DIG. 58 |
| 10,493,716 B2 | | 12/2019 | Qi et al. |
| 2004/0145087 A1 | | 7/2004 | Cerny et al. |
| 2021/0179424 A1 | | 6/2021 | Schneider et al. |

FOREIGN PATENT DOCUMENTS

| | | |
|---|---|---|
| DE | 60308153 T2 | 8/2007 |
| DE | 202017106026 U1 | 12/2017 |
| JP | 2000102930 A | 4/2000 |
| WO | 03072957 A3 | 9/2003 |

OTHER PUBLICATIONS

German Office Action, Application No. 102021122734.8, Dated: Apr. 11, 2022, 7 pages.

* cited by examiner

*Primary Examiner* — Lawrence D Ferguson
(74) *Attorney, Agent, or Firm* — Barley Snyder

(57) ABSTRACT

A casting tool has a tool part that, in a casting position, delimits a hollow of the casting tool and shapes a negative form of a self-supporting cantilever of a cast part. The tool part is transferable from the casting position along a separation direction into a separation position to demold the cast part. The hollow has an undercut with respect to the separation direction that is shaped by the tool part in the casting position.

18 Claims, 4 Drawing Sheets

CASTING TOOL, METHOD AND USE OF A CASTING TOOL FOR POSTFORMING A CAST PART AND CAST PART

CROSS-REFERENCE TO RELATED APPLICATIONS

This application claims the benefit of the filing date under 35 U.S.C. § 119(a)-(d) of German Patent Application No. 102021122734.8, filed on Sep. 2, 2021.

FIELD OF THE INVENTION

The present invention relates to a casting tool for the manufacture of a cast part with a cantilever, and a method for the manufacture of such a cast part. Further, the present invention relates to the use of such a casting tool. Furthermore, the present invention relates to a cast part with a self-supporting cantilever.

BACKGROUND

There are many areas of technology in which cast parts with self-supporting cantilevers are manufactured in casting tools and used in numerous applications, e.g. in electrical engineering as connector housings in which the cantilevers are used for latching, for example, and can be configured as latching hooks. The latching hooks are used, for example, to latchingly secure contact elements located in contact chambers of the connector housing. For this purpose, the latching hooks each run along the contact chamber and provide a suitable support surface for the contact element located in the contact chamber.

However, shaping the cast part, and in particular the cantilever, which can be achieved using conventional casting tools, is subject to limitations. On the one hand, the material behavior of such cast parts during the cooling-down process often causes undesired warping of the cantilever, as a result of which its geometry or final position after demolding the cast part fails to match the original condition from the casting tool. On the other hand, room that is taken up during the casting process by the casting tool itself is obviously not available to the cantilever.

For the connector housings with latching hooks already provided for as an example, this may in some cases mean that the latching hooks warp away from the respective contact chambers as a result of cooling-down, thus diminishing the available support surface. On the other hand, the latching hooks cannot be cast randomly protruding into the contact chamber in order to increase the support surface, since the casting tool occupies most of the contact chamber itself during the casting process for the purpose of shaping the contact chamber.

SUMMARY

A casting tool has a tool part that, in a casting position, delimits a hollow of the casting tool and shapes a negative form of a self-supporting cantilever of a cast part. The tool part is transferable from the casting position along a separation direction into a separation position to demold the cast part. The hollow has an undercut with respect to the separation direction that is shaped by the tool part in the casting position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
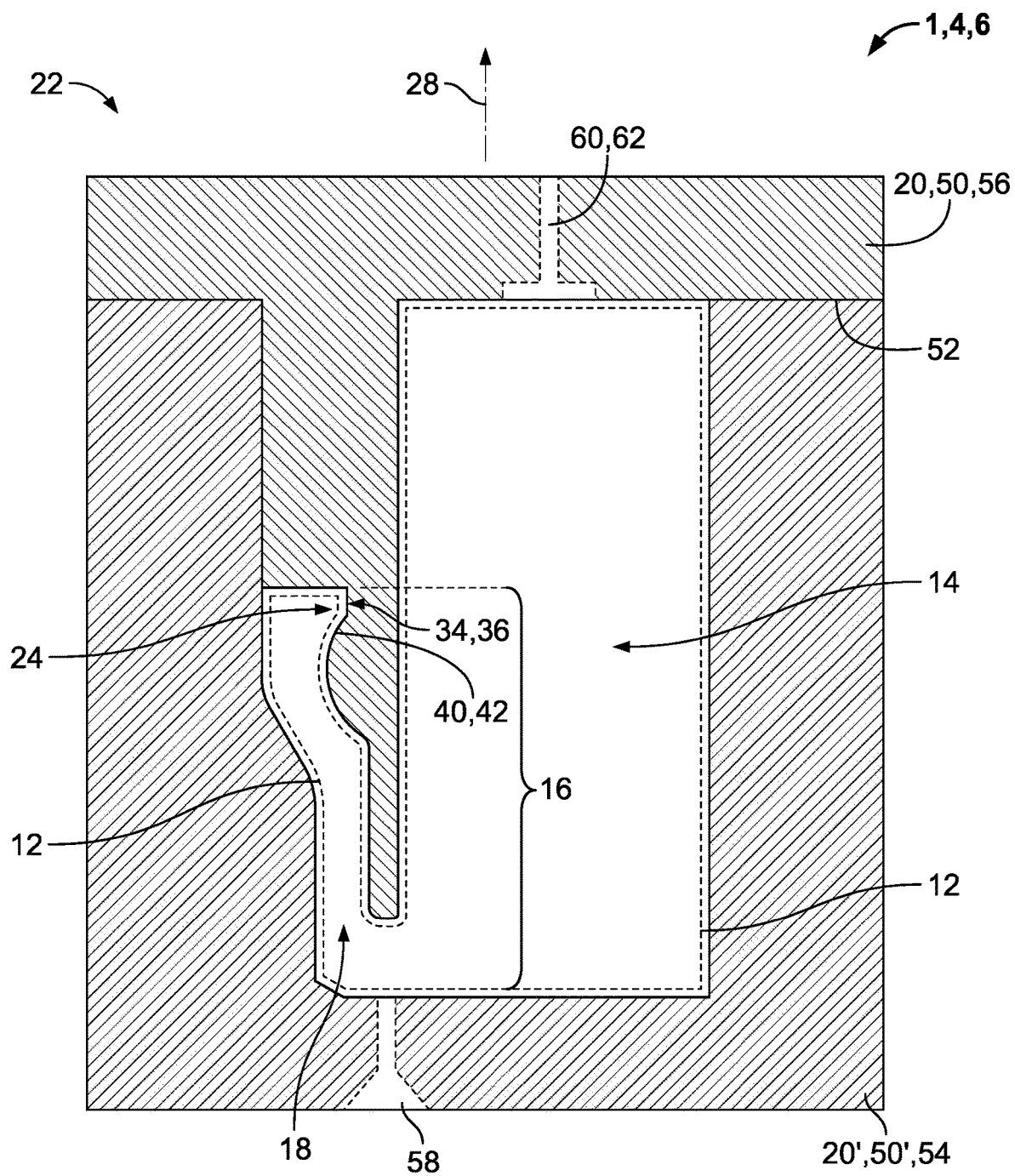
FIG. 1 is a schematic sectional view of a casting tool according to an embodiment.

In the following, the invention is explained in more detail with reference to the drawings by way of a plurality of exemplary embodiments, the various features of which can be combined with one another as desired. In the drawings, for similar, same and functionally identical elements, where appropriate, there are provided identical reference signs.

First of all, the schematic structure of a casting tool 1 according to the invention and of a cast part 2 according to the invention will be explained with reference to FIGS. 1 to 6 in exemplary embodiments. In addition, a method according to the invention for postforming the cast part 2 is explained with reference to FIGS. 2 to 5.

The casting tool 1 shown in FIG. 1 may be, for example, but not exclusively, an injection molding tool 4, in particular a plastic injection molding tool 6. As will be explained in more detail below, the casting tool 1 according to the invention is suitable for postforming a cast part 2 previously manufactured by primary shaping in the casting tool 1 (see FIG. 2). In particular, the casting tool 1 can be used to selectively reshape a cantilever 8 of the cast part 2 in order, for example, to compensate for any subsequent warping of the cantilever 8 due to cooling-down or to obtain a desired geometry or final position 10 (see FIG. 5) of the cantilever 8.

In the exemplary casting tool 1 shown, a negative form 12 of the cast part 2 is present as a cavity 14. Further, a portion 16 of this cavity 14 is configured as a hollow 18 that shapes the negative form 12 of the cantilever 8. The casting tool 1 has a tool part 20 which, in a casting position 22, delimits the hollow 18 at least sectionally, the hollow 18 having an undercut 24 shaped by the tool part 20. The function of this undercut 24 is explained in more detail below. Within the meaning of the present invention, the negative form 12 is a negative contour or a negative of the respective outer form shaped in the casting tool 1.

Figure 5:
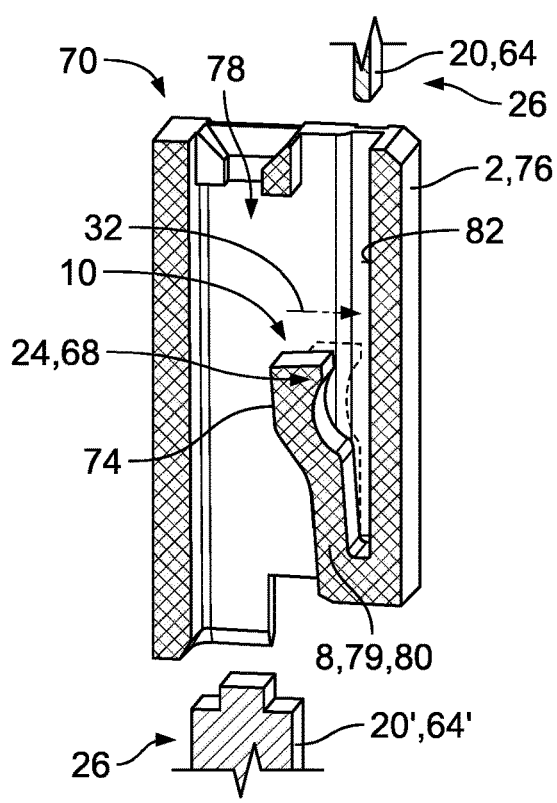
FIG. 5 is another schematic sectional perspective view of the casting tool and the cast part of FIG. 2.

For demolding the cast part 2, the tool part 20 is configured to be transferred from the casting position 22, shown in FIG. 1, to a separation position 26, shown in FIG. 5. In particular, the tool part 20 can be transferred along a separation direction 28 from the casting position 22 to the separation position 26. The undercut 24 of the hollow 18 is an undercut with respect to the separation direction 28 and is shaped mainly by the tool part 20 when it is in the casting position 22.

During the casting process, the tool part 20 is in the casting position 22, so that by introducing material melt into the casting tool 1, the cantilever 8 can be shaped in the hollow 18, while the remainder of the cast part 2 is shaped in the remainder of the cavity 14. Here, in particular, the undercut 24 of the hollow 18 creates a corresponding undercut 24 of the cantilever 8. The tool part 20 and the cantilever 8 rest against each other for the duration of the solidification process (see FIG. 2).

During demolding, the tool part 20 and the cast part 2 are then moved relative to each other (see FIG. 4) along the separation direction 28 until the cast part 2 is released from the tool part 20 in the separation position (see FIG. 5). In this case, in particular, a relative movement 30 occurs between the tool part 20 and the undercut 24 of the newly created cantilever 8. To achieve this relative movement 30, the tool part 20 and/or the cast part 2 can be actively moved.

Since it has an undercut 24 with respect to the separation direction 28, the cantilever 8 is forced to "avoid" the tool part 20 during the relative movement 30. In other words, the cantilever 20 is at least partially displaced or deflected (see FIG. 4) from its original position by the tool part 20 during demolding. In an embodiment, this displacement or deflection is non-destructive. The cast part 2 and the tool part 20 preliminarily latch together mechanically via the undercut 24 of the cantilever 8, this latching being released within the scope of use according to the invention when the cantilever 8 is deflected.

In particular, if this displacement or deflection takes place when the cast part 2 is not yet fully solidified or hardened, plastic deformation of the cantilever 8 can be achieved at least in part (see FIG. 5). In this way, the final position 10 of the cantilever 8 can be adjusted in a way that would not be possible, or not to this extent, with conventional casting tools. For example, the undercut 24 can be used to bend the cantilever 8 to a position that was previously blocked by the casting tool 1 itself or in which the cantilever 8 would have previously blocked the casting tool 1.

Alternatively or additionally, the plastic deformation of the cantilever 8 can be used specifically to compensate for the aforementioned warping of the cantilever 8 due to the cooling-down, provided that the direction 32 and, in an embodiment, also the extent of the warping due to the cooling-down can be predicted in advance. In this respect, the casting tool 1 is configured in such a way that the cantilever 8 is already overbent by the undercut 24 in the opposite direction to 32 during demolding and even before the warping due to the cooling-down sets in. In particular, the cantilever 8 can be overbent by the predicted amount beyond an actual desired final position. As soon as the warping due to the cooling-down then occurs, it returns the cantilever 8 to the actually desired final position. In other words, the influence of warping due to the cooling-down on the cantilever 8 can be selectively compensated or at least minimized by sequentially superimposing plastic deformation and warping due to the cooling-down.

The undercut 24 may be shaped by a portion 34 of the tool part 20 that is complementary in shape to the undercut 24. In the embodiment shown in FIG. 1, the undercut 24 is shaped by a recess 36 in the tool part 20. Alternatively, the undercut 24 can also be shaped by an undercut-like projection 38 on the tool part (see FIG. 6).

In order for the already mentioned relative movement 30 along the separation direction 28 to be converted into a movement transverse to the separation direction 28, the undercut 24 may extend transverse to the separation direction 28. In the exemplary embodiment shown in FIG. 1, in which the undercut 24 is shaped by the recess 36, the recess 36 opens out into the hollow 18 transversely to the separation direction 28. In other words, the recess 36 extends away from the hollow 18 and into the tool part 20.

To prevent the cantilever 8 from possibly getting caught on the tool part 20, the tool part 20 has a withdrawal bevel 40 at the undercut 24. In FIG. 1, the withdrawal bevel 40 is realized by a rounded edge 42 on the surface of the tool part 20. Alternatively, the withdrawal bevel 40 can be shaped by a chamfer 44 (see FIG. 6).

Figure 2:
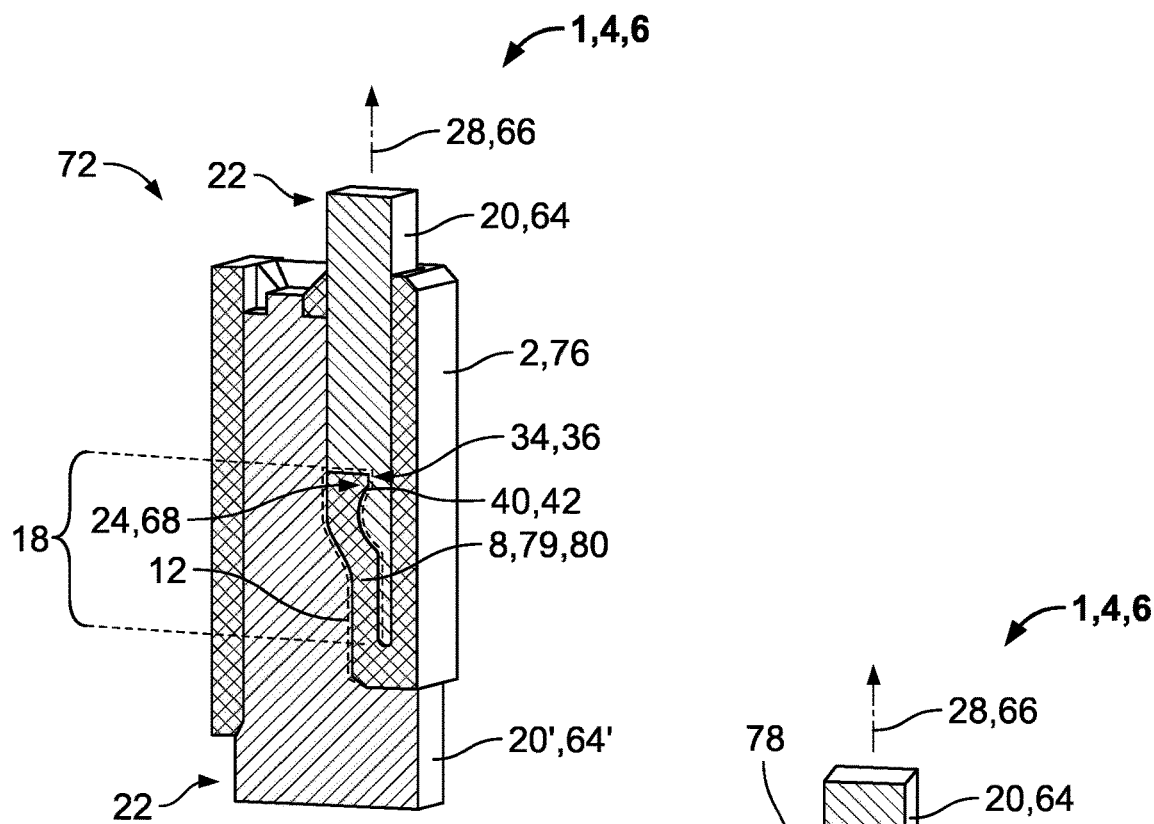
FIG. 2 is a schematic sectional perspective view of a casting tool and a cast part according to another exemplary embodiment.

As shown in FIG. 1, the casting tool 1 can have a further, in an embodiment separate tool part 20', which also, at least sectionally, delimits the hollow 18. Further, the tool parts 20, 20' may jointly create the cavity 14 and may be arranged opposite each other in the casting position 22 with respect to the cavity 14. In FIG. 2, it can be seen that the tool parts 20, 20' can also be arranged opposite each other only with respect to the hollow 18 in the casting position 22. The undercut 24 then, in an embodiment, extends from one tool part 20 toward the other tool part 20'.

The further tool part 20' does not form an undercut of the cavity 18 with respect to the separation direction 28 and is removed first in the course of demolding. Thus, space 48 can be created in advance for deflecting the cantilever 8 (see FIG. 3).

The tool parts 20, 20' shown in FIG. 1 each represent casting mold halves 50, 50' that are configured to be separable from one another along the separation direction 28. In particular, the casting mold half 50 may be moved away from the casting mold half 50' along the separation direction 28 or vice versa. The separation direction 28 can, for example, run perpendicular to a separation plane 52 extending between the casting mold halves 50, 50'. The tool parts 20, 20' can be moved one after another or simultaneously during separation. In some cases, during separation, it may be sufficient to move only one tool part 20, 20'.

One casting mold half 50' is configured as the injection side 54 and the other casting mold half 50 as the ejector side 56. In particular, the injection side 54 may be connected to a plasticating unit via a nozzle 58. The ejector side 56 may in turn be arranged on an ejector unit for the purpose of demolding. In particular, an ejector device 60 of the ejector unit, such as an ejecting rod 62, may partially penetrate the ejector side 56. This is indicated by dotted lines in FIG. 1.

In the embodiment of FIG. 1, the undercut 24 is shaped by the casting mold half 50, which is configured as the ejector side 56. On the one hand, this has the advantage that the cast part 2 always remains reliably on the ejector side 56 in the effective range of the ejector unit when the casting mold halves 50, 50' are separated. Accordingly, thanks to the undercut 24 of the casting tool 1, it is possible to dispense with any other undercuts which would only be provided for retaining the cast part 2 and would otherwise not fulfill any other function. On the other hand, the construction of the undercut 24 on the ejector side 56 advantageously allows the already described postforming the cantilever 8 to take place simultaneously with the demolding of the cast part 2 during the ejection part of the process, so that the cycle time does not have to be extended.

FIG. 2 shows an embodiment in which the casting tool 1 has two sliders 64, 64' as tool parts 20, 20'. The sliders 64, 64' may be provided instead of or in addition to the casting mold halves (not shown in FIG. 2). By using sliders 64, 64', in the design of the cast part 2, there is obtained a greater degree of freedom. Accordingly, the hollow 18 may be limited at least sectionally by the sliders 64, 64' and the undercut 24 of the hollow 18 may be shaped by one of the sliders 64.

Figure 3:
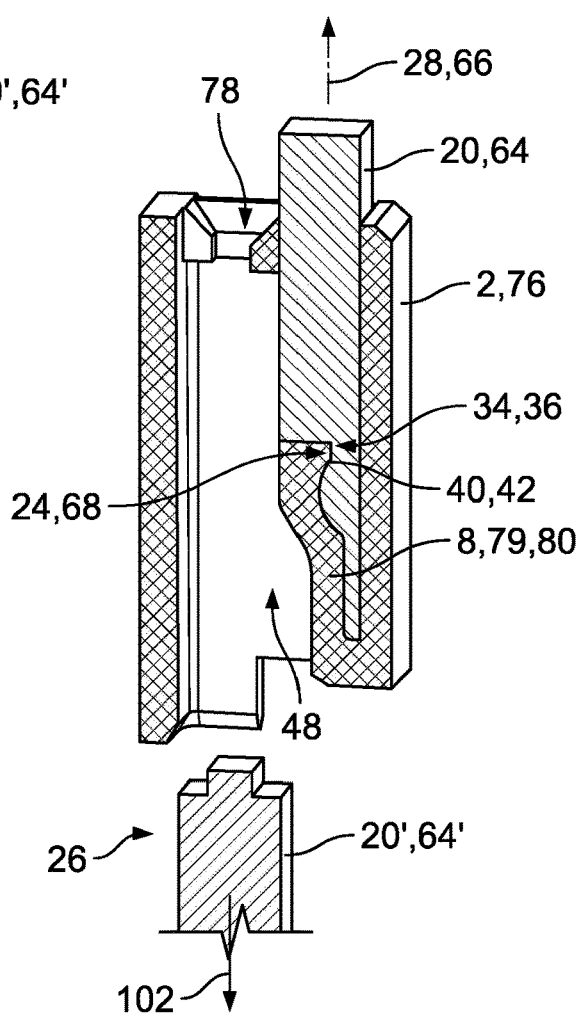
FIG. 3 is a schematic sectional perspective view of the casting tool and the cast part of FIG. 2.
Figure 4:
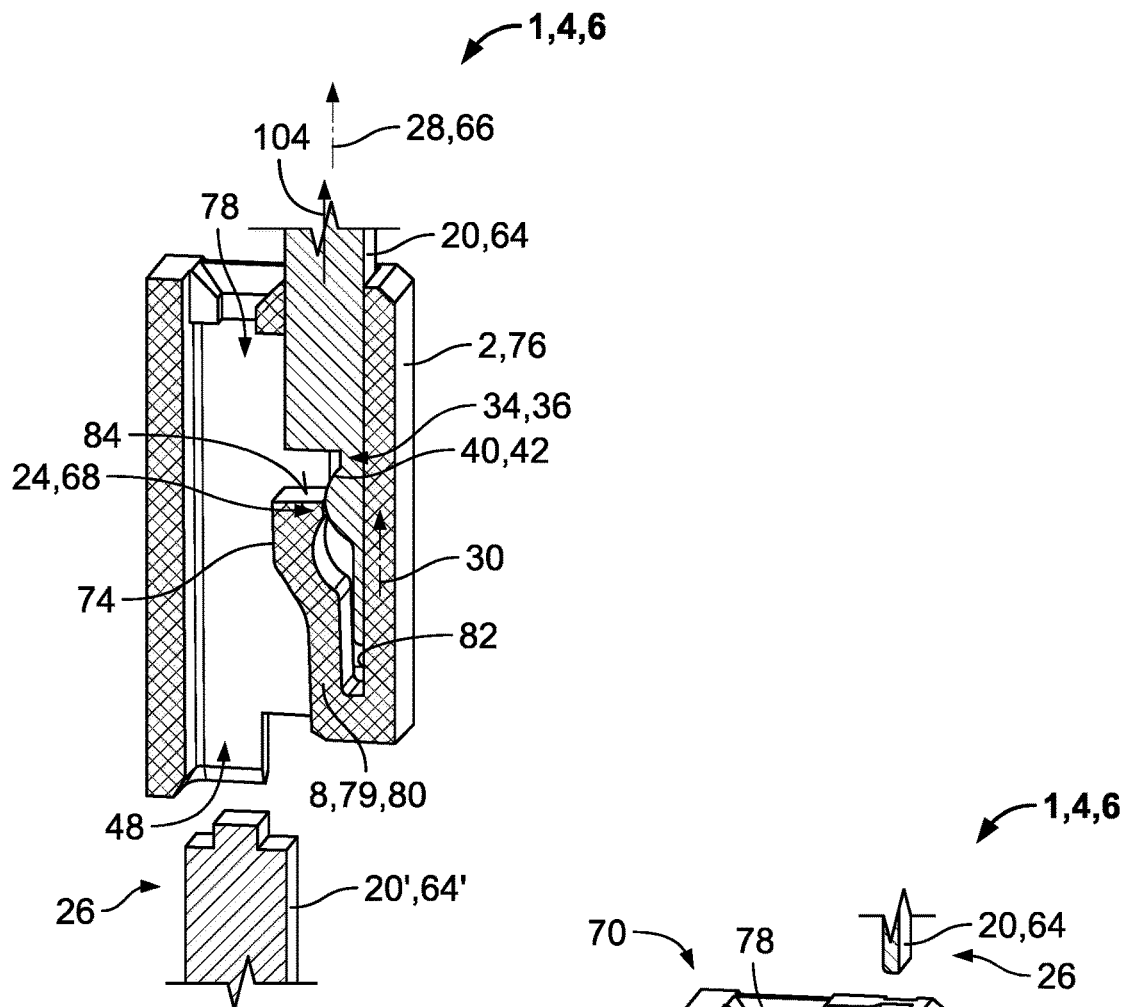
FIG. 4 is another schematic sectional perspective view of the casting tool and the cast part of FIG. 2.

As shown in FIGS. 3 to 5, the sliders 64, 64' can be configured to be removed from the remaining part of the casting tool 1, in particular one at a time, one after the other and in opposite directions. The withdrawal of the slider 64 with the undercut 24 is blocked in this case by the slider 64' or undercut as long as it is in the casting position 22. In particular, the slider 64' not having an undercut is in the way of said displacement or deflection of the cantilever 8, so that the cantilever 8 cannot avoid the slider having an undercut and consequently the slider 64 with the undercut 24 cannot be withdrawn.

Naturally, one tool part can also be configured as a casting mold half and the other tool part as a slider. In addition, the casting tool may include, for example, a core or other mold components.

FIGS. 2 to 6 show exemplary embodiments of the cast part 2 according to the invention. The cast part 2 features the already mentioned self-supporting cantilever 8 with the undercut 24. In particular, the cantilever 8 extends along a longitudinal direction 66 and has a projection 68 extending transversely to the longitudinal direction 66 as an undercut 24.

In the demolded, force-free state 70 (see FIG. 5) of the cast part 2, the cantilever 8 has a position that is deflected in the direction of a side 74 facing away from the undercut 24 compared to a non-demolded state 72 (see FIG. 2) of the cast part 2. This is illustrated in FIG. 5. In particular, the position of the cantilever 8 in the demolded state 70 and the position of the cantilever 8 in the non-demolded state 72, indicated by dashed lines, are juxtaposed there to illustrate the deflection of the cantilever 8.

The direction of the deflection and thus the direction of the postforming can be specifically influenced by arranging the undercut 24 opposite the side 74 of the cantilever 8 to which the cantilever 8 is to be deflected. For this purpose, the projection 68 of the cantilever 8 can be turned away from the side 74.

In FIGS. 4 and 5, the cantilever 8 is plastically deformed at least sectionally compared with the non-deformed state 72, in particular compared with the state immediately after casting, and is thus permanently deflected.

The cast part 2 of FIGS. 2 to 5 is, for example, a connector housing 76 with a contact chamber 78. This contact chamber 78 may be shaped, for example, from the already mentioned space 48 left by the tool part 20'.

The cantilever 8 is part of the connector housing 76. In particular, the cantilever 8 is configured as a latching hook 79 or latching tab 80 that extends from an inner wall 82 of the connector housing 76, extends into the contact chamber 78, and extends at least partially along the contact chamber 78. Within the contact chamber 78, the latching tab 80 provides a support surface 84 for a contact element received within the contact chamber 78. Due to the plastic deformation, the latching tab 80 can be permanently bent into the contact chamber 78 to overlap more with the contact chamber 78, thereby increasing the support surface area 84 for the contact element.

The casting tool 1 shown in FIGS. 2 to 5 is configured accordingly for shaping the connector housing 76. The hollow 18 represents the negative form 12 of the latching tab 80. The entire cavity 14 of the casting tool 1 accordingly shapes the negative form of the entire connector housing 76.

The cast part 2 according to the invention can, of course, have a plurality of self-supporting cantilevers 8. In this case, for example, the tool part 20 for each cantilever 8 delimits a hollow 18 that shapes a negative form of the respective cantilever 8 in the tool part 20. To ensure that each hollow 18 has an undercut 24, for example, a plurality of undercut-like projections 38 are provided on the tool part 20. This is indicated by dashed lines in the detailed view from FIG. 6, which show the tool part 20 located in the casting position 22.

Figure 6:
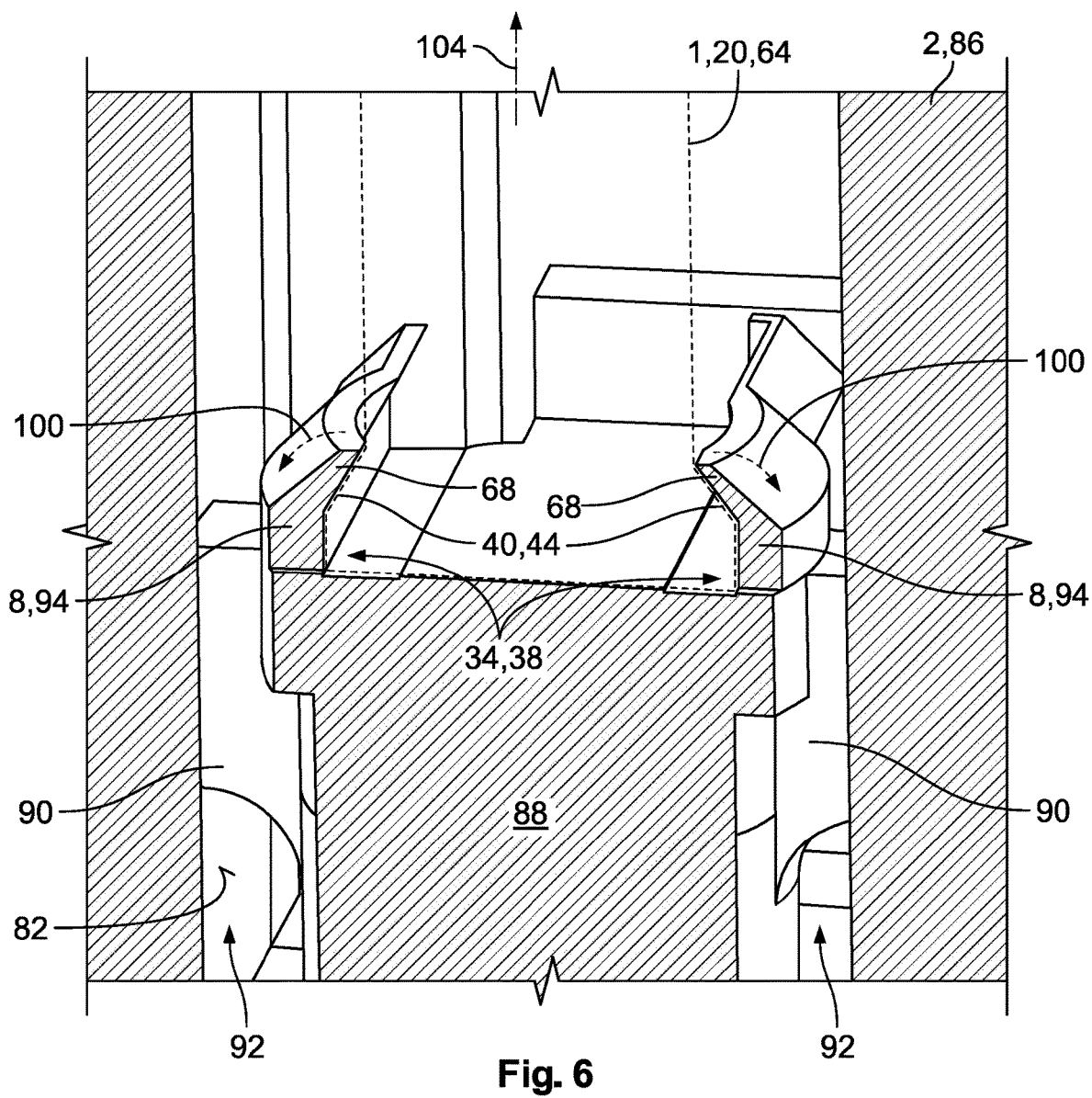
FIG. 6 is a schematic sectional perspective detail view of a cast part according to another embodiment.

The cast part 2 according to the invention shown in FIG. 6 is a component 86 with an internal placeholder element 88, which is intended to be burrlessly removable if required and is therefore held on an inner wall 82 of the component 86 only by isolated material bridges 90. Internal gaps 92 of the component 86 extend between the inner wall 82 and the placeholder element 88, which cannot be closed by a material connection between the placeholder element 88 and the inner wall 82 due to the required removability.

Nevertheless, in order to keep the gaps 92 as small as possible, the cantilevers 8 are each configured as flap-like elements 94, which are postformed by the undercuts 24 when the component 86 is demolded. In particular, as the tool part 20 is withdrawn, the elements 94 are folded over by the undercut-like projections 38 to at least partially close the internal gaps 92. This is indicated by dashed arrows 100 in FIG. 6.

The method according to the invention for postforming the cast part 2 can be carried out integrated in a casting process for the manufacture of the cast part 2 as follows. In the casting process, a casting tool 1 according to one of the aforementioned embodiments is provided in the casting position 22. The material melt already mentioned above, for example a plastic melt, is introduced, poured or injected into the cavity 14 of the casting tool 1. The material melt is then at least partially solidified so that it solidifies at least to some extent to form the cast part 2. FIG. 2 shows this condition, although for reasons of clarity the casting mold halves surrounding the shown cast part 2 and the sliders 64, 64' are not explicitly shown.

Finally, the cast part 2 is demolded from the casting tool 1. For this purpose, for example, the slider 64' without undercut 24 is the first to be withdrawn from the casting tool 1 along the separation direction 28. This is indicated by arrow 102 in FIG. 3. As can also be seen from FIG. 3, in this case the cast part 2 remains on the slider 64 with the undercut 24 due, among other things, to the undercut 24. In addition, the cast part 2 can also be retained by the casting mold halves, which are not shown.

Next, the slider 64 with the undercut 24 is withdrawn from the casting tool 1 in the opposite direction. This is indicated by arrow 104 in FIG. 4. The cantilever 8 is deflected here by the undercut 24 transverse to the separation direction 28. To ensure that there is still sufficient moldability of the cantilever 8 during this time, this deflection is carried out as far as possible before the cast part 2 or the material melt has completely solidified. This results in the plastic deformation of the cantilever 8 shown in FIG. 5.

In other words, postforming the cantilever 8 occurs during demolding the cast part 2 due to the purposefully provided undercut 24. In particular, the cast part 2 may still be in the casting tool 1 or may be about to be completely removed from the tool part 20 with the undercut 24.

What is claimed is:

1. A casting tool, comprising:
   a tool part that, in a casting position, delimits a hollow of the casting tool and shapes a negative form of a self-supporting cantilever of a cast part, the tool part is transferable from the casting position along a separation direction into a separation position to demold the cast part, the hollow has an undercut with respect to the separation direction that is shaped by a portion of the tool part in the casting position; and
   a further tool part delimiting the hollow, the tool part and the further tool part are a pair of casting mold halves, the tool part has a first surface opposite a second surface of the further tool part, the first surface and the second surface are shaped differently, the first surface and the second surface each shape the negative form of the self-supporting cantilever.

2. The casting tool of claim 1, wherein the further tool part does not shape the undercut of the hollow with respect to the separation direction.

3. The casting tool of claim 2, wherein the undercut extends from the tool part toward the further tool part transversely to the separation direction.

4. The casting tool of claim 2, wherein the tool part and the further tool part are separable from one another along the separation direction.

5. The casting tool of claim 2, wherein one of the casting mold halves is an injection side and the other of the casting mold halves is an ejector side.

6. The casting tool of claim 5, wherein the undercut is shaped by the one of the casting mold halves that is the ejector side.

7. The casting tool of claim 2, wherein the tool part and the further tool part are a pair of sliders, each slider of the pair of sliders is configured to be withdrawn from the casting tool.

8. The casting tool of claim 7, wherein the withdrawal of one of the sliders is blocked by the other slider of the pair of sliders.

9. The casting tool of claim 1, wherein the casting tool shapes a connector housing, the self-supporting cantilever is part of the connector housing and has a latching hook.

10. The casting tool of claim 9, wherein the hollow is a negative shape of the latching hook.

11. A cast part demolded from a casting tool, comprising:
a connector housing having a contact chamber; and
a self-supporting cantilever having an undercut, the self-supporting cantilever extends from an inner wall of the connector housing and extends into the contact chamber, the self-supporting cantilever having a position in a demolded, force-free state of the cast part that is moved in a direction facing away from the undercut compared to a non-demolded state.

12. The cast part of claim 11, wherein the self-supporting cantilever is plastically deformed in the demolded, force-free state compared to the non-deformed state.

13. The cast part of claim 11, wherein the self-supporting cantilever is a latching tab, the latching tab provides a support surface for a contact element received within the contact chamber.

14. The casting tool of claim 1, wherein the tool part has a withdrawal bevel extending away from the portion of the tool part, the withdrawal bevel has a rounded edge on the first surface of the tool part.

15. The casting tool of claim 14, wherein the tool part has an extension part extending from the withdrawal bevel.

16. The casting tool of claim 15, wherein the extension part has a rectangular shape, an end of the rectangular shape has rounded edges.

17. The casting tool of claim 1, wherein the pair of casting mold halves are not mirror images of each other.

18. The casting tool of claim 1, wherein the cast part and the tool part preliminarily latch together via the undercut of the cantilever.

* * * * *